United States Patent
Zebuhr

(10) Patent No.: US 7,427,336 B2
(45) Date of Patent: Sep. 23, 2008

(54) BLADE HEAT EXCHANGER

(75) Inventor: William H. Zebuhr, Nashua, NH (US)

(73) Assignee: Zanaqua Technologies, Inc., Hudson, NH (US)

( * ) Notice: Subject to any disclaimer, the term of this patent is extended or adjusted under 35 U.S.C. 154(b) by 475 days.

(21) Appl. No.: 10/870,018

(22) Filed: Jun. 17, 2004

(65) Prior Publication Data

US 2005/0279620 A1 Dec. 22, 2005

(51) Int. Cl.
*B01D 1/16* (2006.01)
*B01D 1/28* (2006.01)
*B01D 3/08* (2006.01)
*F28B 3/08* (2006.01)

(52) U.S. Cl. ............ 202/182; 202/202; 202/236; 202/238; 165/165; 165/166; 165/113; 159/28.6; 159/4.3

(58) Field of Classification Search .......... 202/202, 202/238, 182, 236; 159/28.6, 4.3, 6.1; 165/165, 165/166, 164, 113, 167
See application file for complete search history.

(56) References Cited

U.S. PATENT DOCUMENTS

| | | | |
|---|---|---|---|
| 2,703,310 A | 3/1955 | Kretchmar | |
| 2,894,879 A | 7/1959 | Hickman | |
| 2,899,366 A | 8/1959 | Hickman | |
| 3,136,707 A * | 6/1964 | Hickman | 202/236 |
| 3,291,704 A * | 12/1966 | Diedrich et al. | 202/236 |
| 3,568,766 A | 3/1971 | Thomas | |
| 3,637,465 A | 1/1972 | Wilson | 203/11 |
| 3,640,330 A * | 2/1972 | Javet | 159/6.1 |
| 3,764,483 A | 10/1973 | Tleimat | |
| 3,840,070 A | 10/1974 | Becker et al. | |
| 3,890,205 A | 6/1975 | Shnitzer | |
| 4,125,946 A | 11/1978 | Prager | |
| 4,129,014 A | 12/1978 | Chubb | |
| 4,235,679 A | 11/1980 | Swaidan | |
| 4,267,021 A | 5/1981 | Speros et al. | |
| 4,270,981 A | 6/1981 | Stark | 202/172 |
| 4,348,261 A | 9/1982 | Saari | 203/25 |
| 4,402,793 A | 9/1983 | Petrek et al. | |
| 4,504,361 A | 3/1985 | Tkac et al. | |
| 4,585,523 A | 4/1986 | Giddings | |
| 4,585,524 A | 4/1986 | Hoiss | 203/11 |
| 4,586,985 A | 5/1986 | Ciocca et al. | |
| 4,671,856 A | 6/1987 | Sears | |
| 4,707,220 A | 11/1987 | Feres | |
| 4,731,159 A | 3/1988 | Porter et al. | |
| 4,778,566 A | 10/1988 | Vinz | 202/153 |

(Continued)

FOREIGN PATENT DOCUMENTS

GB 757085 9/1956

(Continued)

*Primary Examiner*—Virginia Manoharan
(74) *Attorney, Agent, or Firm*—Foley Hoag LLP

(57) ABSTRACT

A blade heat exchanger includes blades that extend axially with respect to an axis of rotation and are elongated in the radial direction. The blades are arranged about the axis such that, when they are disposed in a housing, they form composite condensation and evaporation chambers that are isolated from each other. The interiors of at least some of the blades form the composite condensation chamber. The exteriors of the blades and the inner surface of the housing cooperate to form the composite evaporation chamber.

24 Claims, 10 Drawing Sheets

U.S. PATENT DOCUMENTS

| | | | |
|---|---|---|---|
| 4,822,455 A | 4/1989 | Olrik | |
| 5,045,155 A | 9/1991 | Ramsland | |
| 5,333,677 A | 8/1994 | Molivadas | 165/272 |
| 5,409,576 A | 4/1995 | Tleimat | |
| 5,411,640 A | 5/1995 | Ramsland | |
| 5,628,879 A | 5/1997 | Woodruff | |
| 5,810,975 A | 9/1998 | Bourdel | |
| 5,927,383 A | 7/1999 | Ramm-Schmidt et al. | |
| 6,238,524 B1 | 5/2001 | Zebuhr | |
| 6,261,419 B1 | 7/2001 | Zebuhr | |
| 6,423,187 B1 | 7/2001 | Zebuhr | |
| 6,319,408 B1 | 11/2001 | Zebuhr | |
| 6,328,536 B1 | 12/2001 | Zebuhr | |
| 6,375,803 B1 | 4/2002 | Razzaghi et al. | 203/1 |
| 6,695,951 B1 * | 2/2004 | Bitterly et al. | 202/182 |
| 2002/0037224 A1 | 3/2002 | Zebuhr | |
| 2002/0038555 A1 | 4/2002 | Zebuhr | |
| 2002/0092624 A1 | 7/2002 | Zebuhr | |
| 2002/0092757 A1 | 7/2002 | Zebuhr | |
| 2002/0092758 A1 | 7/2002 | Zebuhr | |
| 2002/0092759 A1 | 7/2002 | Zebuhr | |
| 2002/0092762 A1 | 7/2002 | Zebuhr | |

FOREIGN PATENT DOCUMENTS

| | | |
|---|---|---|
| WO | WO 00/35551 | 6/2000 |
| WO | WO 00/35552 | 6/2000 |
| WO | WO 02/02202 A2 | 1/2002 |

* cited by examiner

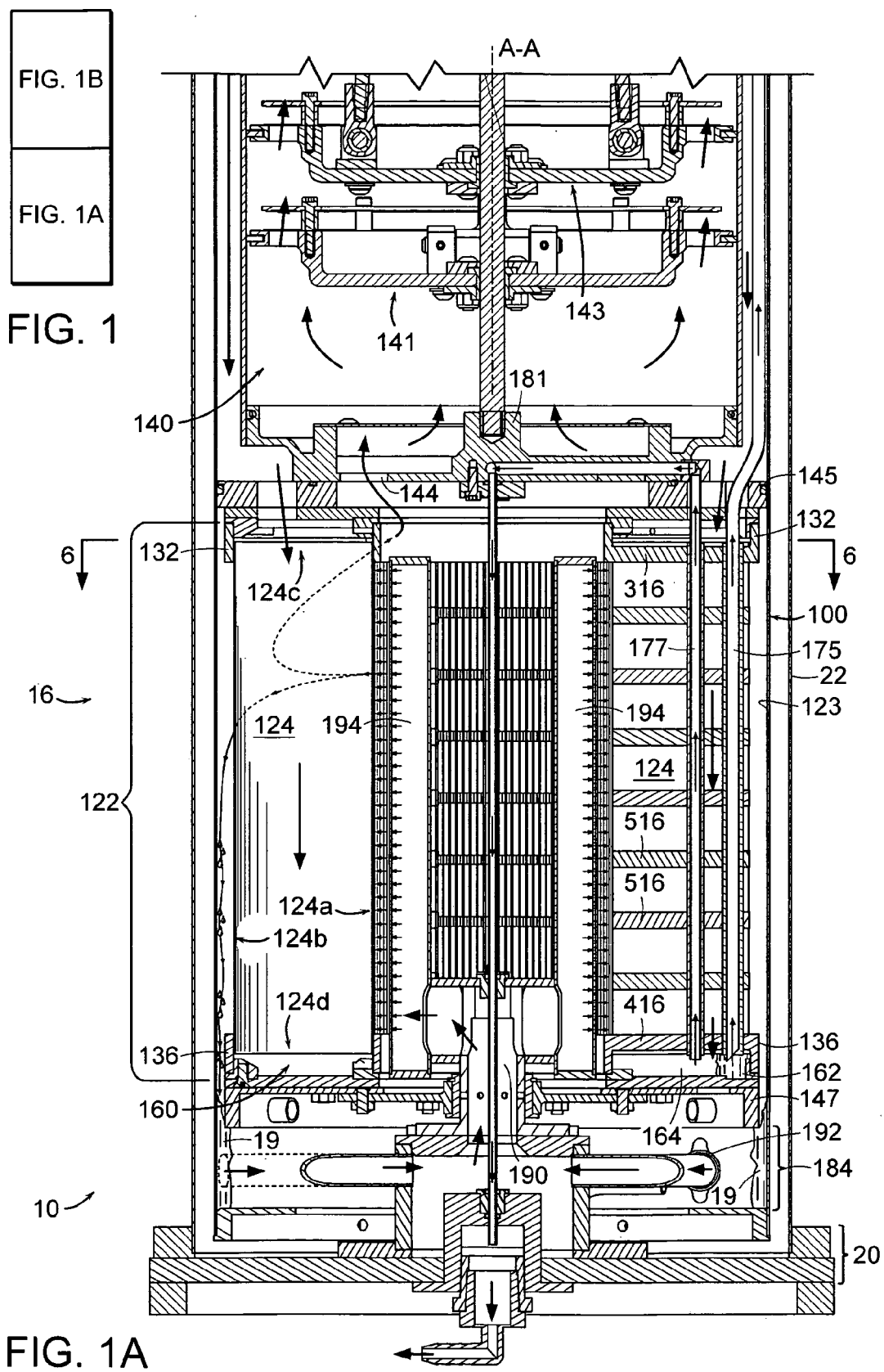

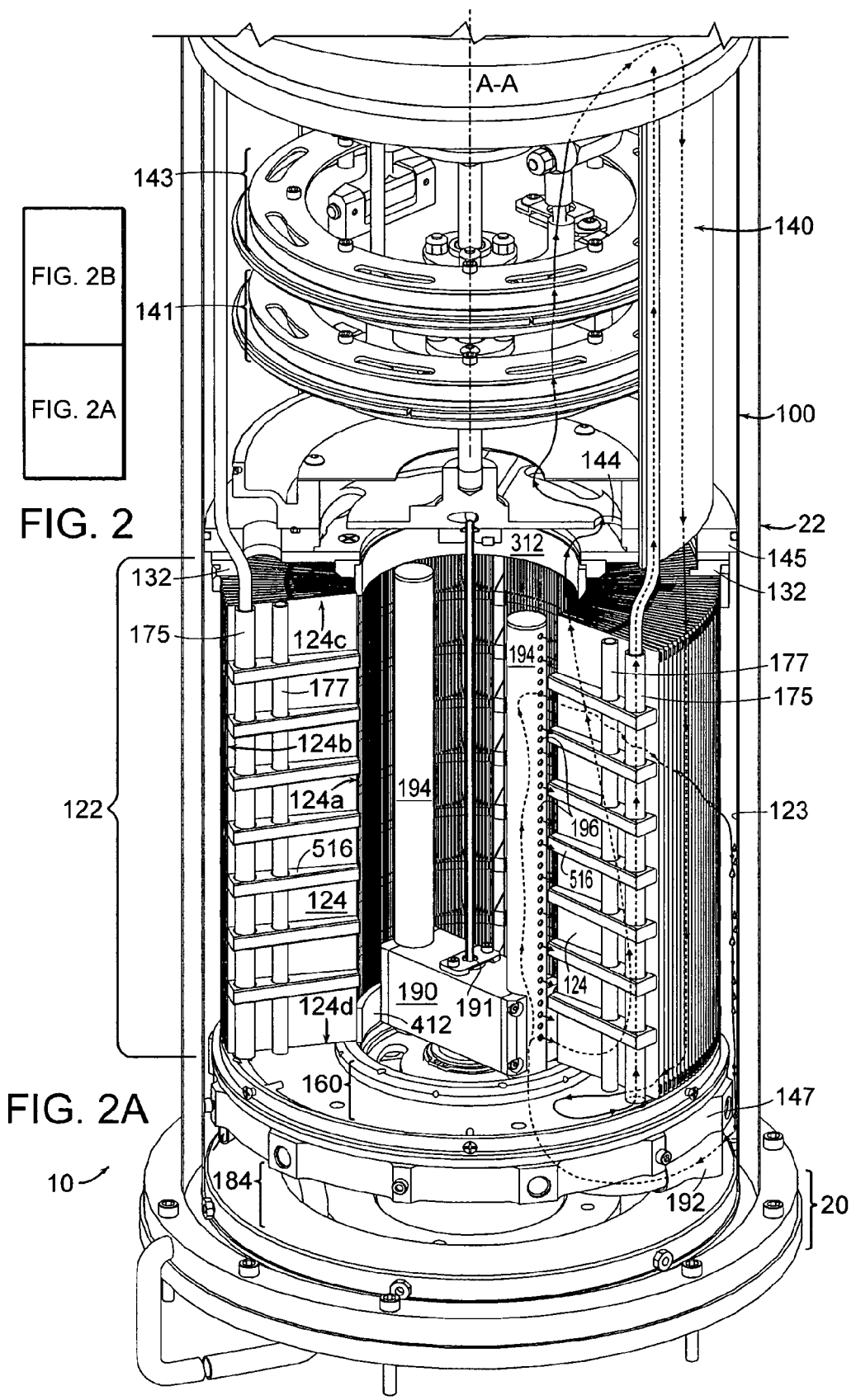

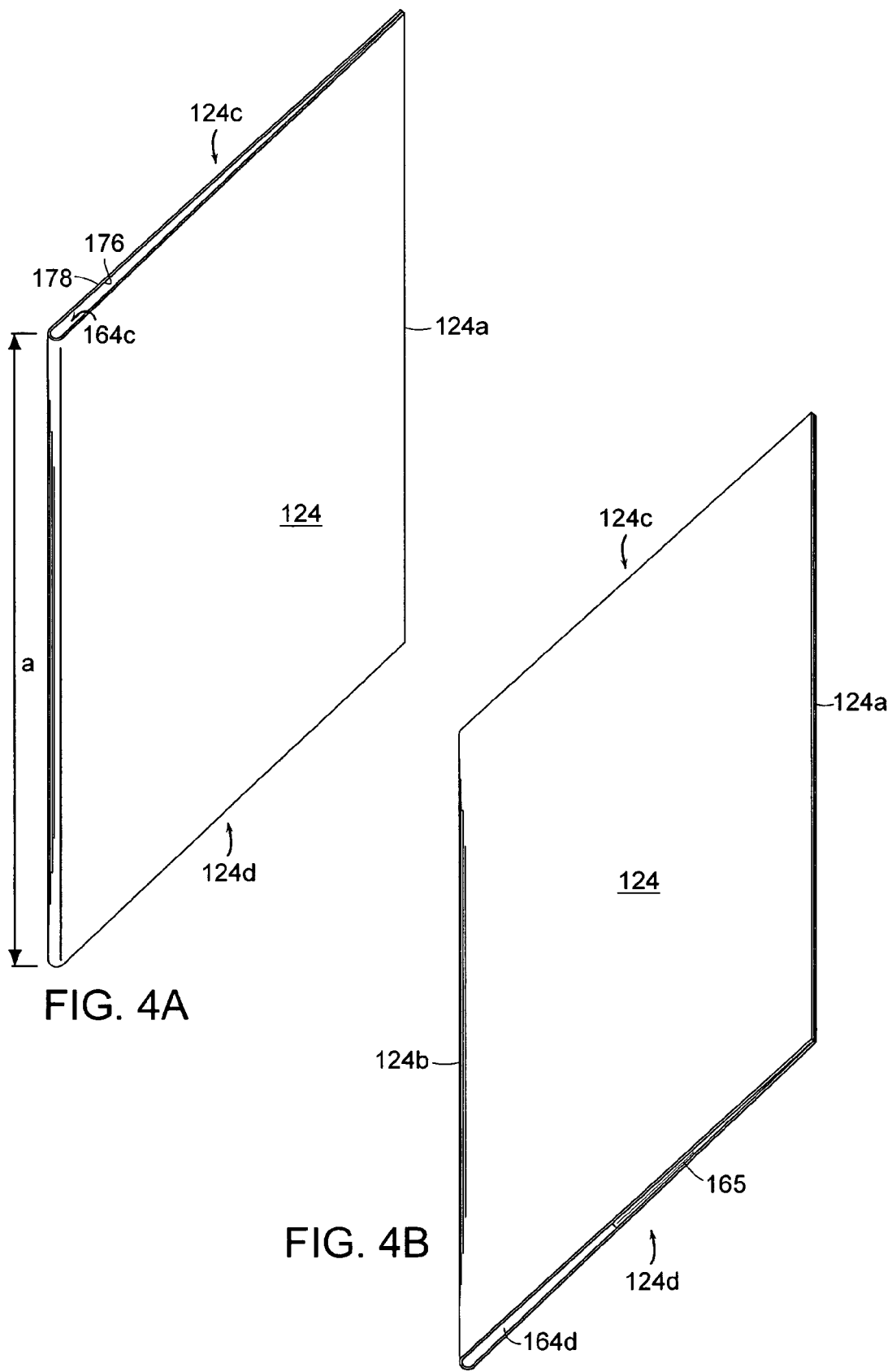

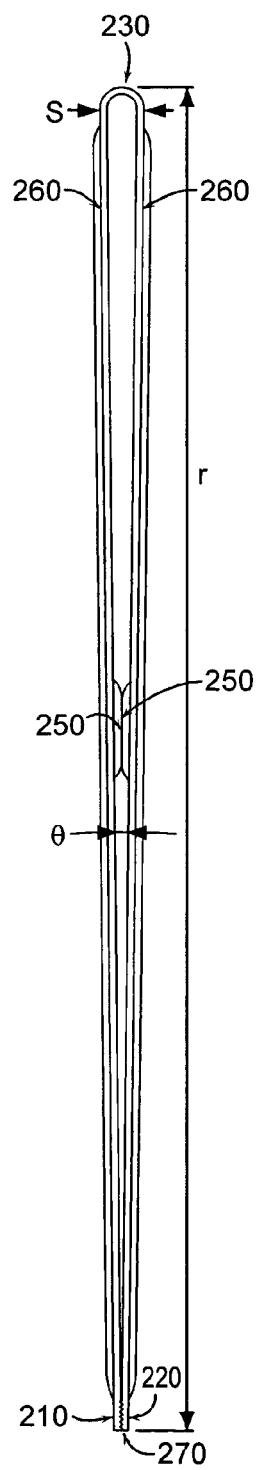
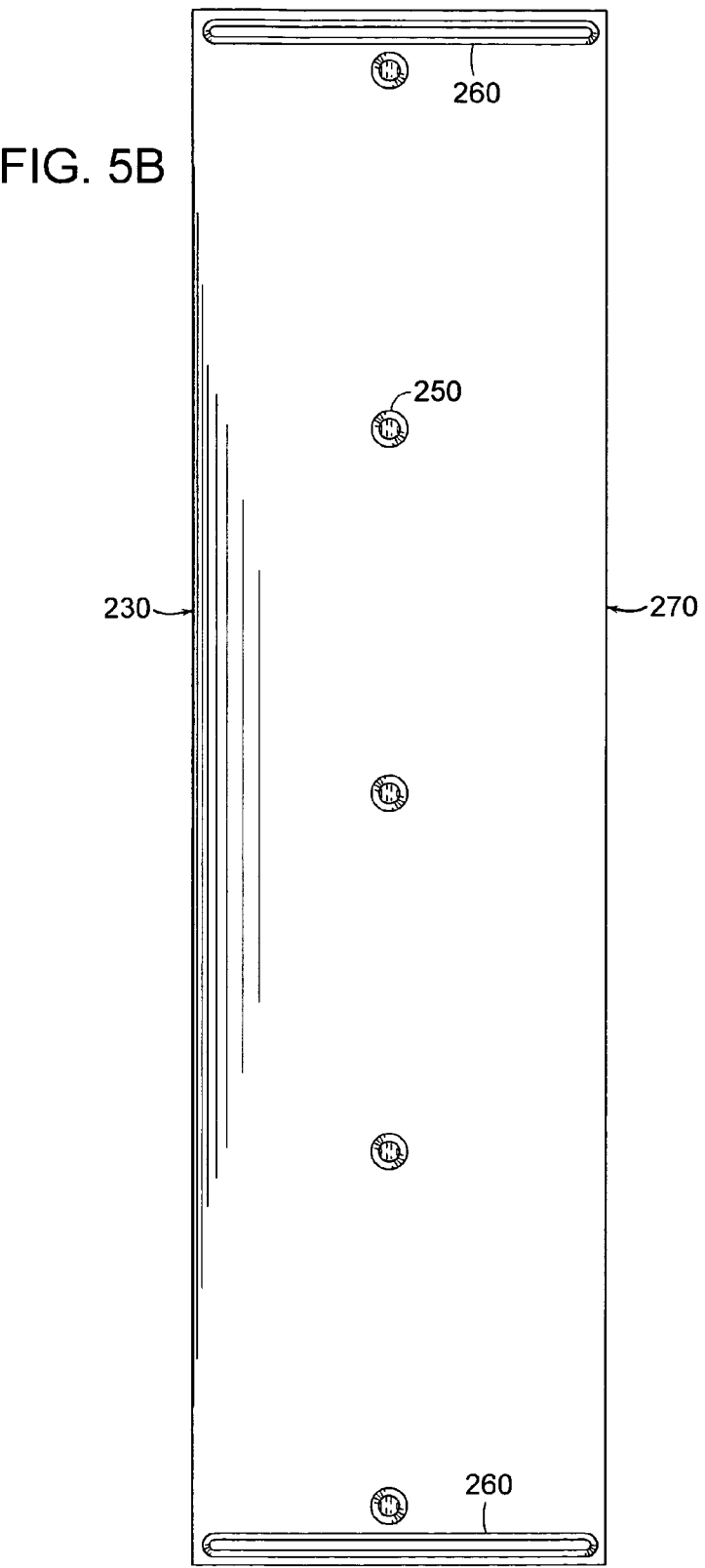
FIG. 5B
FIG. 5C

BLADE HEAT EXCHANGER

BACKGROUND

Distillation is a method of purifying a liquid (such as water) or, conversely, producing a concentrate (such as concentrated orange juice). In distillation, feed liquid to be distilled is heated to the point of evaporation, and the resulting vapor (e.g., steam) is collected and condensed.

Some distillation systems include rotary heat exchangers. One type of rotary heat exchanger includes vertically stacked, horizontally oriented annular plates that are disposed in a housing and mounted for rotation about a central vertical axis. An example of this type of heat exchanger is described in U.S. Pat. No. 6,238,524, which is assigned to the assignee of the present application and incorporated by reference herein in its entirety. Another type of rotary heat exchanger includes a vertically folded, accordion-shaped plate that is disposed in a housing and mounted for rotation about a central vertical axis. An example of this type of heat exchanger is described in U.S. patent application Ser. No. 09/609,881, which is also assigned to the assignee of the present application and incorporated by reference herein in its entirety.

Two factors that are commonly considered during design of rotary heat exchangers are cross-contamination and venting. Cross-contamination refers to the situation that results when the liquid being evaporated (e.g., unpotable water) comes into contact with and contaminates the resulting distillate, and venting refers to the removal of air and other gases that do not condense during distillation (i.e., non-condensables). Some rotary heat exchangers present risks of cross-contamination that make them unsuitable for generating potable distilled water, while other rotary heat exchangers remove non-condensables via complex flow paths that complicate fabrication and can reduce distillation efficiency.

SUMMARY

I have invented a rotary heat exchanger that tends to reduce the risk of cross contamination between the liquid being evaporated and the resulting distillate and that can readily be arranged to permit non-condensables to be removed along simple flow paths. Additionally, it turns out that the cost of fabrication tends to be low. These heat exchangers are referred to herein as "blade heat exchangers."

My blade heat exchanger includes axially-extending blades that extend parallel to the axis about which the heat exchanger is to rotate and are elongated in the radial direction. The blades are arranged about the axis and so disposed in a housing as to form composite condensation and evaporation chambers that are isolated from each other. The interiors of at least some of the blades cooperate to form the composite condensation chamber, while the exteriors of the blades cooperate with the housing's inner surface to form the composite evaporation chamber. The composite evaporation chamber extends through radial passages between opposite exterior surfaces of adjacent blades to the radial extent of the housing.

In most embodiments, the entrances of the radial passages between the opposite exterior surfaces of at least some of the adjacent blades span a distance that is less than 1.8 mm (70 mils) and, preferably, between 0.4 mm (15 mils) and 0.8 mm (30 mils). This spacing and other features of my blade heat exchangers cooperate to facilitate distillation.

BRIEF DESCRIPTION OF THE DRAWINGS

My blade heat exchangers can be more fully understood by referring to the following detailed description and accompanying drawings, which are not drawn to scale.

FIGS. 1A and 1B are a cross-sectional view of a distillation system that includes an exemplary blade heat exchanger.

FIGS. 2A and 2B are a perspective view of the distillation system of FIG. 1.

FIGS. 4A and 4B are perspective views of a blade of the exemplary blade heat exchanger of FIG. 1.

FIGS. 5A-5C are flow diagrams that schematically illustrate a method of fabricating the blade of FIGS. 4A and 4B.

DETAILED DESCRIPTION

Figure 1B:
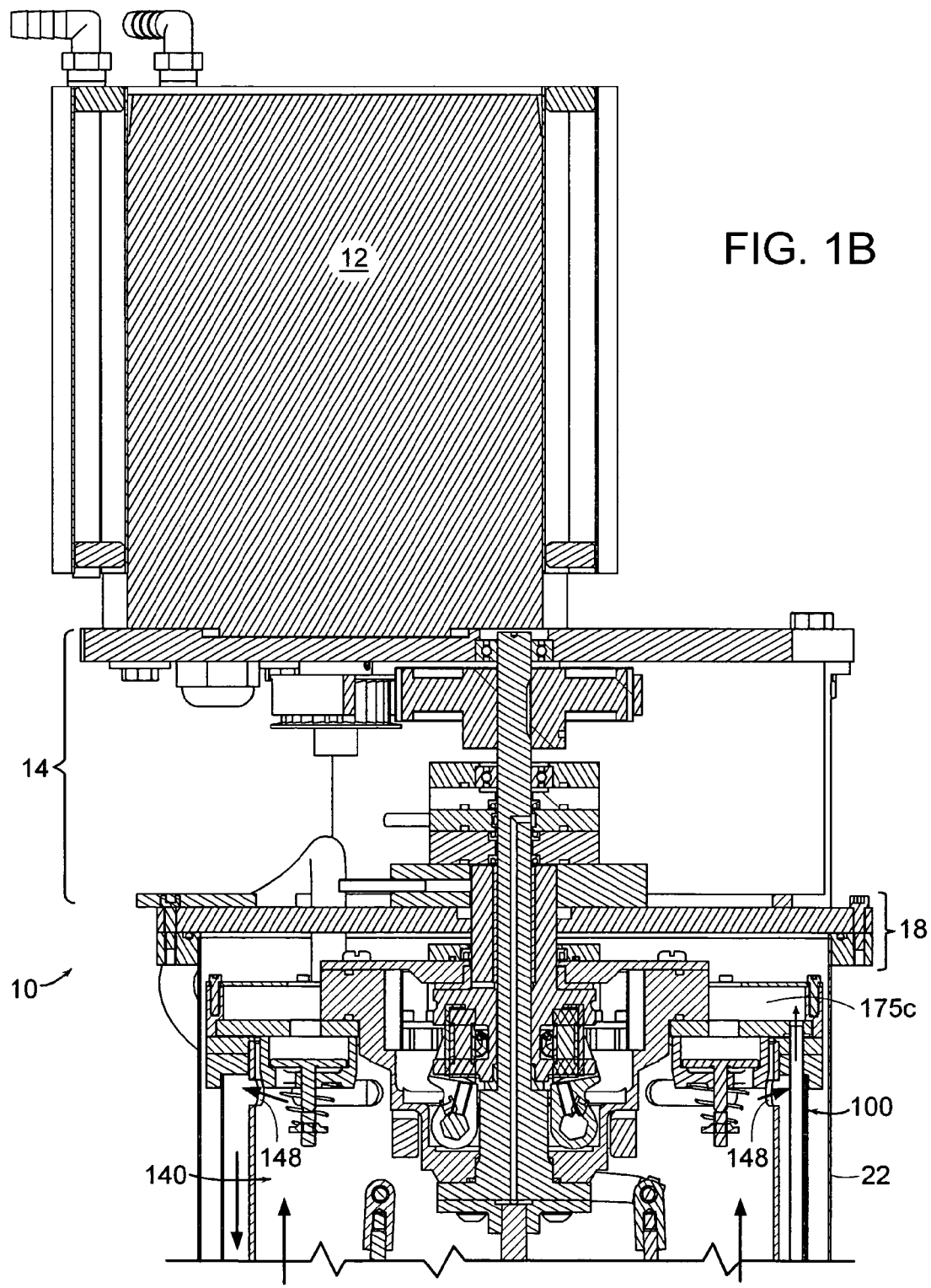

Illustrative embodiments will now be described to provide an overall understanding of the disclosed blade heat exchangers. One or more examples of the embodiments are shown in the drawings. Those of ordinary skill in the art will understand that the disclosed blade heat exchangers can be adapted and modified to provide devices and systems for other applications, and that other additions and modifications can be made to the disclosed blade heat exchangers without departing from the scope of the present invention.

Figure 2B:
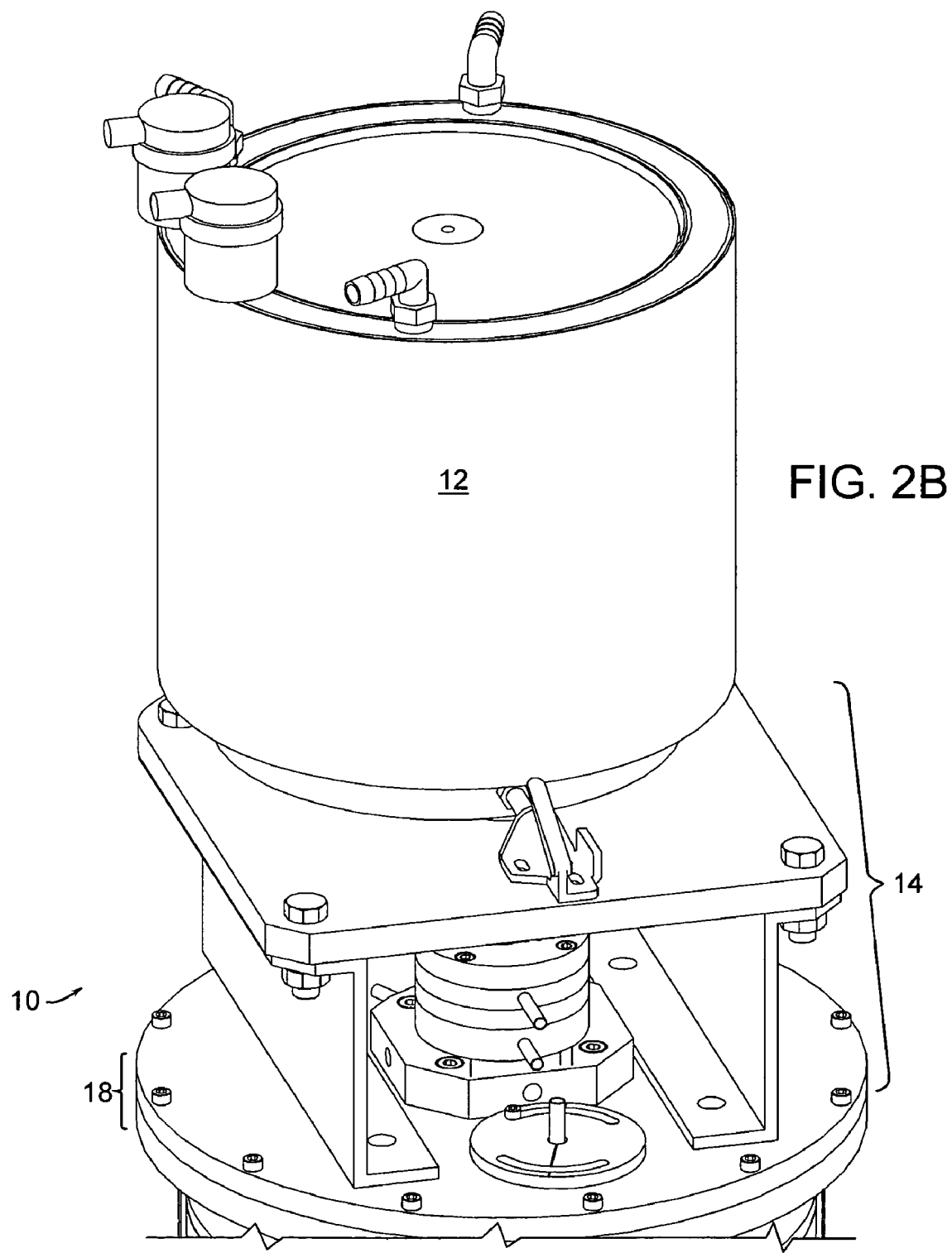

FIGS. 1A and 1B together form a cross-sectional view of a distillation system that includes an exemplary blade heat exchanger, and FIGS. 2A and 2B together are a perspective view of the distillation system. As shown in FIGS. 1A, 1B, 2A, and 2B, the distillation system 10 includes a rotary-power source 12, a gear housing 14 on which the rotary-power source 12 is mounted, and a stationary vapor-chamber housing 16 on which the gear housing 14 is mounted. The vapor-chamber housing includes end caps 18 and 20 and a sidewall 22. A generally cylindrical shell 100 is disposed within the vapor-chamber housing 16, and a compressor 140 is disposed within the shell 100 and includes pistons 141 and 143. An exemplary blade heat exchanger 122 is disposed within the shell 100. It is separated from the compressor 140 by a first separation plate 145. A sump 184 is disposed within the shell 100 and separated from the blade heat exchanger by a second separation plate 147. During operation, the rotary-power source 12 rotates the shell 100 and thereby the compressor 140 and the blade heat exchanger 122.

As FIGS. 1A and 2A show, the blade heat exchanger 122 includes blades 124 that extend axially with respect to a central axis about which the rotary-power source 12 causes them to rotate. As described below, the interiors of at least some of the blades 124 are constituent condensation chambers that cooperate to form a composite condensation chamber, while the passages between opposite exterior surfaces of at least some of the adjacent blades 124 are constituent evaporation chambers that cooperate to form a composite evaporation chamber. The blades 124 form edges 124a and 124b that are disposed radially inward and outward, respectively, with respect to the rotational axis A-A. The blades' first axial ends 124c are disposed adjacent the compressor 140, and their second axial ends 124d are disposed opposite the first axial ends 124c and adjacent a distillate-collection receptacle 160. The blades 124 are mounted in a frame 157 (shown in detail FIG. 3) and between first and second end plates 132 and 136

(shown in detail in FIG. 7) that are disposed in the shell 100 so as to be substantially perpendicular to the axis A-A. The end plates 132 and 136 form inner-diameter edges 132a and 136a and outer-diameter edges 132b and 136b. As shown in FIGS. 1A and 2A, the distillate-collection receptacle 160 is substantially toroidal and mounted to the inner- and outer-diameter edges of the second end plate 136.

As FIGS. 1A, 1B, and 2A show, the compressor 140 includes compressor inlets 144 for receiving a vapor at a first vapor pressure from the blade heat exchanger 122, pistons 141 and 143 for compressing the vapor to a second, higher vapor pressure, and compressor outlets 148 for emitting the vapor at the higher vapor pressure to the blade heat exchanger 122.

As FIG. 1A shows, the sump 184 is disposed in the shell 100 on the side of the heat exchanger 122 opposite the compressor 140. The sump 184 receives the liquid that system 10 is to distill, and an inlet 190 provides liquid-flow paths to the heat exchanger 22's 1interior. The inlet 190 includes feed tubes 192 that extend to near the inner surface 123 of the sump 184's sidewall 120 and open in the direction opposite the sump 184's rotation so as to collect rotating fluid 19 that centrifugal force urges against that surface.

The liquid inlet 190 also includes stationary axially-extending spray tubes 194 that are disposed in the interior of the heat exchanger 122 at locations radially inward from the blades 124. The spray tubes 194 include openings 196 facing radially outward from the central axis A-A toward the blades 124.

As FIGS. 1A, 1B, 2A, and 2B show, the rotary-power source 12 is coupled to the shell 100 through gearing in gear housing 14 to rotate the shell 100 and thereby the compressor 140 and the heat exchanger 122 about the central axis A-A.

As FIGS. 1A, 1B, 2A, and 2B show, the shell 100 includes removal tubes 175 and 177 by which distillate and non-condensables leave the distillate-collection receptacle 160. Generally, the distillate-collection receptacle 160 includes a first region 162 for collecting distillate, e.g., distilled water, and a second region 164 for collecting non-condensables, e.g., air and other gases that are present in feed water and that do not condense during distillation. During the system 10's operation, the shell 100's rotation tends to generate a vertical or near-vertical level of distillate along the inner surface of the collection receptacle 160's outer edge. As FIG. 1A shows, the distillate-removal tube 175 therefore extends into the first region 162 near the inner surface of the collection receptacle 160's outer edge, and the non-condensables-removal tube 177 extends into the second region 164 near the collection receptacle 160's interior. In the collection receptacle 160, the distillate removal tube 175 is disposed outward far enough to receive the distillate, and the non-condensables-removal tube 177 opens inward far enough to collect non-condensables.

As FIGS. 1A, 1B, 2A, and 2B show, the removal tubes 175 and 177 extend upward from the distillate-collection receptacle 160, between a pair of adjacent blades 124, and outward from the blade heat exchanger 122 to the distillation system 10's exterior. FIGS. 1A and 2A show that, after the non-condensable-removal tube 177 leaves the blade heat exchanger 122, it enters the interior of the blade heat exchanger 122 through a plug 181, continues along the central axis A-A, passes through an opening 191 in the liquid inlet 190, and leaves the vapor-chamber housing 16 through a rotary coupling and the end cap 20. FIGS. 1A, 1B, 2A, and 2B show that, after the distillate-removal tube 175 leaves the blade heat exchanger 122, it continues along the compressor 140 and empties into channel 175c, from which a scoop tube (not shown) collects distillate for removal from distillation system 10.

Figure 3:
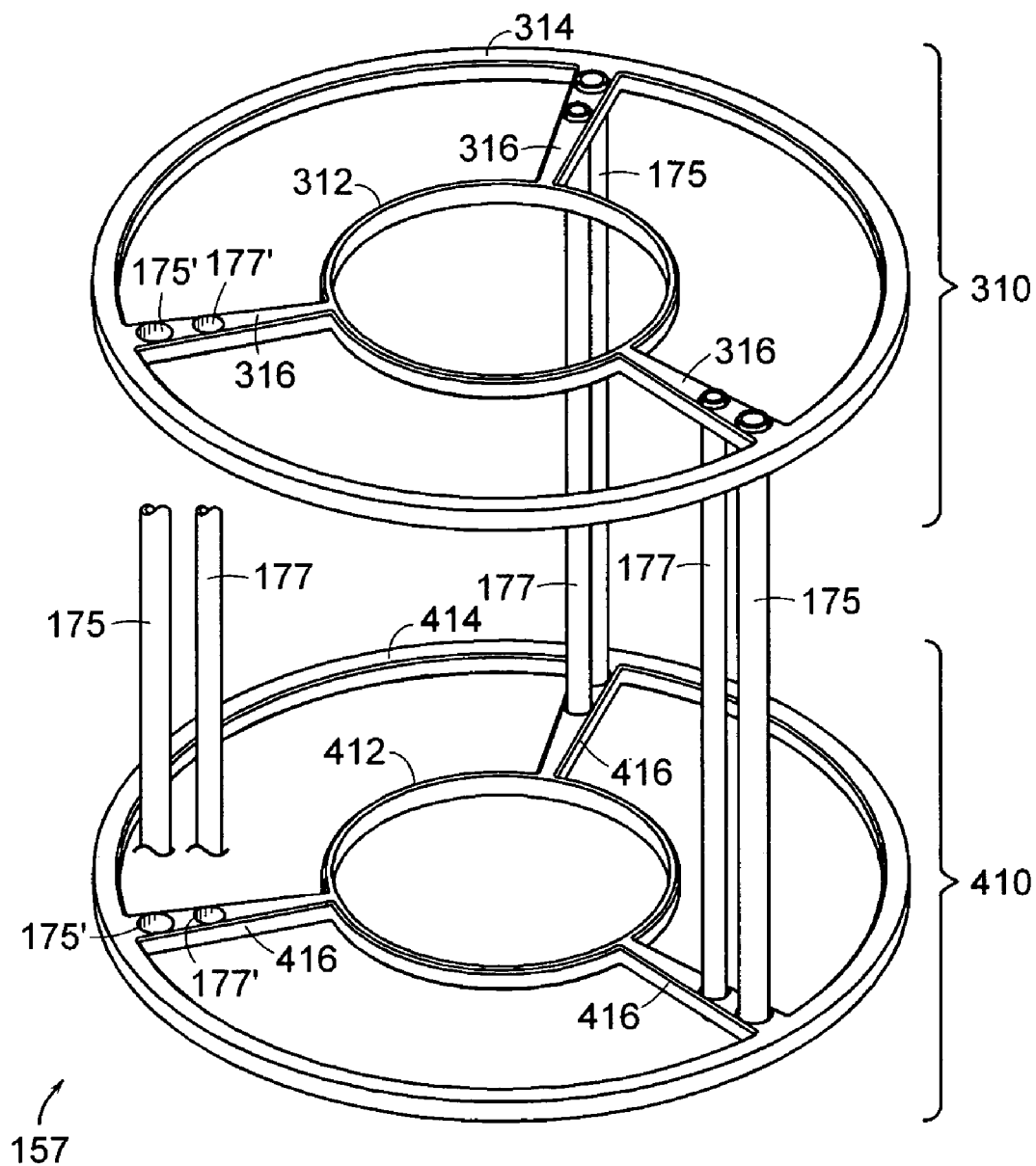
FIG. 3 is a perspective view of a frame for the exemplary blade heat exchanger of FIG. 1.

FIG. 3 is a perspective view of the frame 157 into which the blades 124 of the blade heat exchanger 122 are mounted. As FIG. 3 shows, the frame 157 includes first and second frame elements 310 and 410. The frame elements 310 and 410 include respective inner rings 312 and 412 and respective outer rings 314 and 414, which are concentric with the inner rings 312 and 412 and connected by radially-extending support members 316 and 416 to the inner rings 312 and 412. Support members 316 are spaced from each other at substantially equal angular intervals, as are support members 416.

As FIG. 3 shows, the support members 316 and 416 in the first and second frame elements 310 and 410 support the removal tubes 175 and 177. Generally, each of the support members 316 and 416 includes axial openings that are disposed near the intersection of the support members 316 and 416 with the outer rings 314 and 414. As FIG. 3 shows, the axial openings include outer openings 175' and inner openings 177'. The outer openings 175' are disposed nearer to the outer rings 314 and 414. The support members 316 and 416 are disposed in the frame elements 310 and 410 such that the axial openings 175' and 177' in the support members 316 are axially aligned with the respective axial openings 175' and 177' in the support members 416. The distillate-removal tubes 175 extend through the outer openings 175' in the support members 316 and 416, and the non-condensable removal tubes 177 extend through the inner openings 177' in the support members 316 and 416.

FIGS. 1A, 1B, 2A, and 2B schematically illustrate the mounting relationships among the blades 124, the first and second end plates 132 and 136, and the frame 157. The blades 124 are disposed in the frame 157 between the inner rings 312 and 412 and outer rings 314 and 414. The frame 157 is disposed in the housing 104 such that the inner rings 312 and 412 and outer rings 314 and 414 are perpendicular to the central axis A-A. The first end plate 132 is disposed between the inner and outer rings 312 and 412 in the first frame element 310 so as to seal the first axial ends 124c of the blades 124, and the second end plate 136 is disposed between the inner and outer rings 314 and 414 in the second frame element 410 so as to seal the second axial ends 124d of the blades 124. As FIGS. 1A and 2A show, the removal tubes 175 and 177 are supported by the support members 316 and 416 and by additional radially-extending support members 516, which are disposed along the portions of the removal tubes 175 and 177 that extend between adjacent blades 124. The pressure exerted on the additional support members 516 by the adjacent blades 124 tends to hold the additional support members 516 in place. To enhance the stability of the frame 157, the support members 316, 416, and/or 516 may, in some embodiments, be secured to the blades 124 by, for instance, adhesives, braising, soldering, or welding.

As will be understood by those of ordinary skill in the art, the features of the disclosed blade heat exchangers shown and described with respect to FIGS. 1A, 1B, 2A, 2B, and 3 are exemplary and are to be interpreted in an illustrative and non-limiting manner. A variety of changes can be made to the features shown and described with respect to FIGS. 1A, 1B, 2A, 2B, and 3 without departing from the scope of the present invention.

For example, the disclosed blade heat exchangers can be used in distillation systems whose rotary-power sources, compressors, and collection receptacles differ greatly from those described above. The rotary-power sources can include cranks, engines, fluid drives, motors, water wheels, and other types of rotary-power sources known to those of ordinary skill in the art. The compressors need not be of the illustrated, positive-displacement variety, and they can be disposed outside the shell 100 as well as inside it. Additionally, the collection receptacles need not be toroidal.

Also, the disclosed blade heat exchangers can be mounted in frames that differ from those that FIG. 3 depicts. In some embodiments, the inner rings 312 and/or 412 will include projections that extend radially outward and that are disposed around the inner rings 312 and 412 so as to form slots or teeth into which the inner radial edges 124a of the blades 124 are mounted. Alternatively and/or in combination, the outer rings 314 and/or 414 can include projections that extend radially inward and that form slots or teeth into which the outer radial edges 124b of the blades 124 are mounted. In some embodiments, the blades 124 in the disclosed blade heat exchangers may be mounted solely between the first and second end plates 132 and 136, without a supporting frame 157. Alternatively, the blades 124 in the disclosed blade heat exchangers can be mounted in the first end plate 132, without a supporting frame 157 or a second end plate 136.

Also, the disclosed blade heat exchangers can be used in distillation systems 10 that remove distillate and/or non-condensables in other ways. For example, one or more of the blades themselves can provide removal paths by which to vent non-condensables from the distillate-collection receptacle 160. In one such embodiment, one or more blades, although open at their second axial ends adjacent the distillate-collection receptacle as the other blades are, could be closed at their axial ends adjacent the compressor so as not to admit steam from the compressor, and conduits similar to the upper portions of tubes 175 and/or 177 could remove distillate and/or noncondensables from those blades' interiors.

Similarly, the paths taken by one or more distillate- and/or non-condensables-removal tubes similar to tubes 175 and/or 177 could, instead of passing between blades, extend through one or more respective blades' interiors.

FIGS. 4A and 4B are respectively top and bottom perspective views of a blade 124 included in the exemplary blade heat exchanger 122 of FIG. 1. As shown in FIG. 4A, blade 124 includes an interior surface 176, an exterior surface 178, and openings 164c and 164d in its first and second axial ends 124c and 124d. The openings 164c and 164d allow fluid communication between the interior 162 of the blade 124, the compressor 140, and the distillate-collection receptacle 160.

In the illustrated embodiment, the opening 164c in the first axial end 124c extends along substantially the entire radial extent of the blade 124, i.e., substantially the entire extent from the inner radial edge 124a to the outer radial edge 124b of the blade. An opening 164c of such a size facilitates the conversion of compressed vapor to distillate by minimizing the resistance to flow of compressed vapor from the compressor 140 to the interior 163 (shown in FIG. 6) of the blade 124. (Of course, other embodiments may have smaller openings.) Since the distillate leaving the interior 162 of the blade 124 through the opening 164d in the second axial end 124d is denser than the compressed vapor entering the interior 162 of the blade 124 and will tend to be forced to the outer radial edge 124b during rotation of the heat exchanger 122, the opening 164d may be smaller than the opening 164c. As FIG. 4B shows, for example, an inner portion 165 of the interior 162 of the blade 124 is blocked adjacent the second axial end 124d so that the opening 164d extends along only a portion of blade 124's radial extent.

Figure 5A:
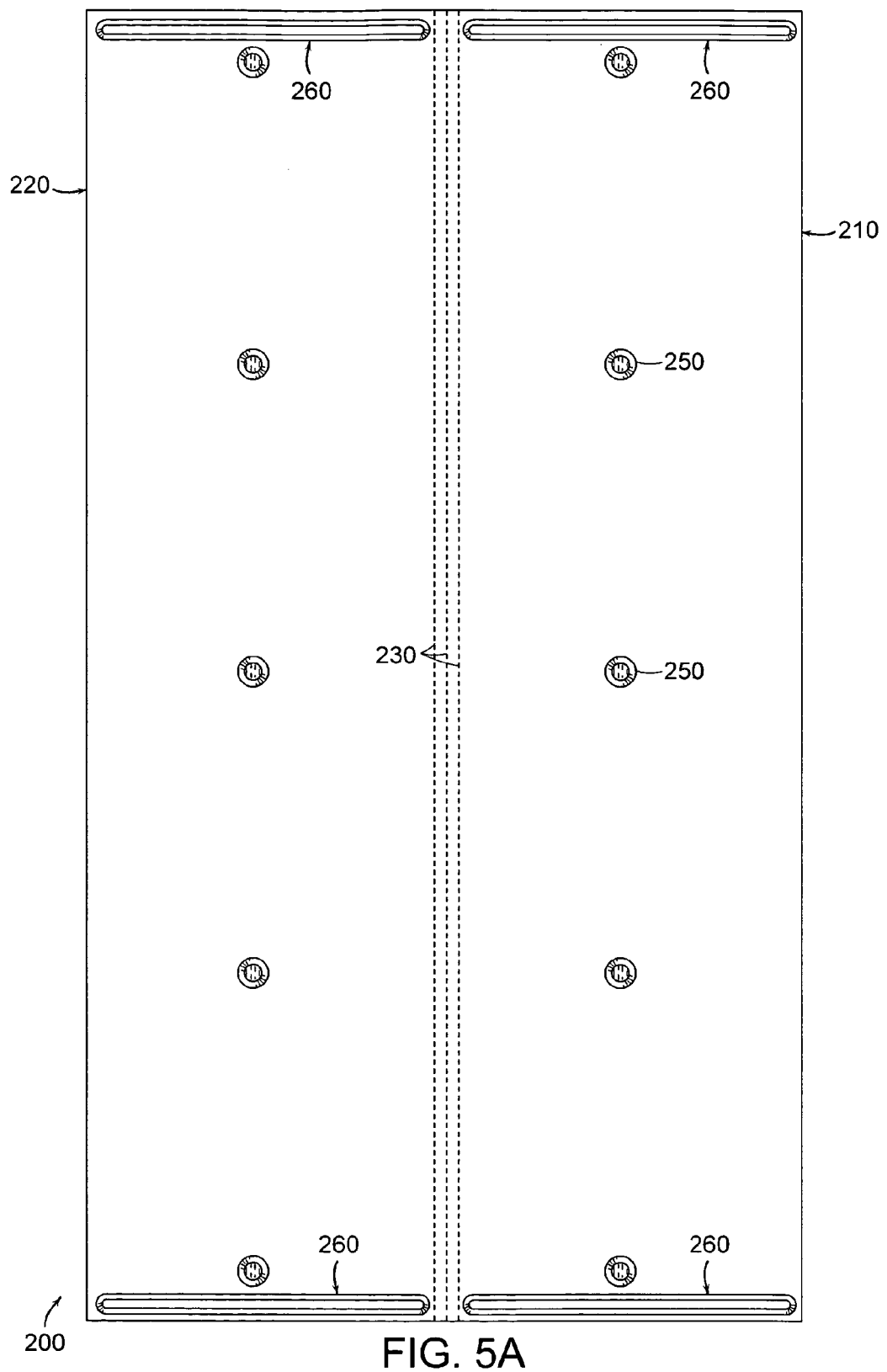

There is nothing critical about the way in which the blades 124 are made, but FIGS. 5A-5C illustrate one way. FIG. 5A depicts a substantially rectangular plate 200 from which the blade is to be made. The plate 200 is formed from a thermally conductive material such as copper, stainless steel, or some other metal or alloy. The plate 200 includes two substantially parallel opposing edges 210 and 220. As shown in FIGS. 5A and 5B, the rectangular plate 200 is folded about axially-extending fold lines 230 that extend parallel to the opposing edges 210, 220. As shown in FIG. 5C, after the plate 200 is folded, the opposing edges 210 and 220 are joined together by braising, soldering, welding, and/or other techniques at an axially-extending junction 270 radially spaced from the fold lines 230. Note that no waste results from this approach to fabrication; nothing has to be cut from the rectangular blank to produce the blade. This contrasts with heat exchangers made of, say, annular plates. To make the annular plates requires cutting the interior opening as well as the curved outer periphery, and the metal removed is waste.

As FIGS. 1, 2, 5A-5C, and 6 show, the blades 124 that result from folding plates 200 are, in the illustrated embodiment, arranged in the heat exchanger 122 such that the axially-extending fold lines 230 and junctions 270 are co-planar with the central axis A-A, and such that the junctions 270 are disposed radially inward from the fold lines 230. But the invention does not require such an arrangement. The fold lines 230 and junctions 270 need not be co-planar with the central axis A-A, for example, and, if they are, they need not be parallel with it. For example, they may intersect the central axis A-A at an imaginary location above or below the sump 184, possibly resulting in a simple or truncated conical shape, in which the cone's larger end may face toward or away from the sump 184.

In some embodiments, the plate 200 includes dimples. For example, as shown in FIGS. 5A and 5B, the plate 200 includes two rows of dimples 250 arranged symmetrically with respect to the fold line 230. As shown in FIG. 5C, the plate 200 is so folded that the dimples 250 protrude inward in alignment with one another. The dimples are then joined together by braising, soldering, welding, and/or other techniques to enhance the resulting blade's stability.

Other embodiments that employ dimples may arrange them differently. In some, multiple rows of dimples may be formed on both sides of the fold lines 230. Others may have dimples on only one side of the fold lines.

In some embodiments, the plate 200 may include raised projections, such as FIG. 5A's pairs of raised projections 260, that extend from the fold line 230 to the opposing edges 210, 220. As suggested in FIG. 2A, the raised projections 260 act as stops for the end plates 132 and 136 and thereby facilitate mounting the blades 124 in the frame 157. Other embodiments may include multiple pairs of projections 260 disposed along the axial extent of the plate 200 for the same purpose.

As FIG. 4A shows, the blade 124 axially a distance a, and, as FIG. 5C shows, it extends a radial distance r and a circumferential distance s. The blades' interiors are elongated in the radial direction: r exceeds s. Preferably, for such a blade, the radial elongation ratio R, which represents the ratio of its radial extent r to its circumferential extent s, is greater than 10; in most embodiments, in fact, it will probably be between 20 and 50.

Preferably, the axial elongation ratio A of the blade 124, which represents the ratio of its axial extent a to its radial extent r, is at least 1; in most embodiments, in fact, it will probably be between 3 and 6.

The volume-to-surface area ratio V/A of the blade 124, i.e., the ratio of its interior volume to the surface area of its exterior surface 178, should be less than 1.5 mm (60 mils), and preferably between 0.25 mm (10 mils) and 0.5 mm (20 mils).

Figure 6:
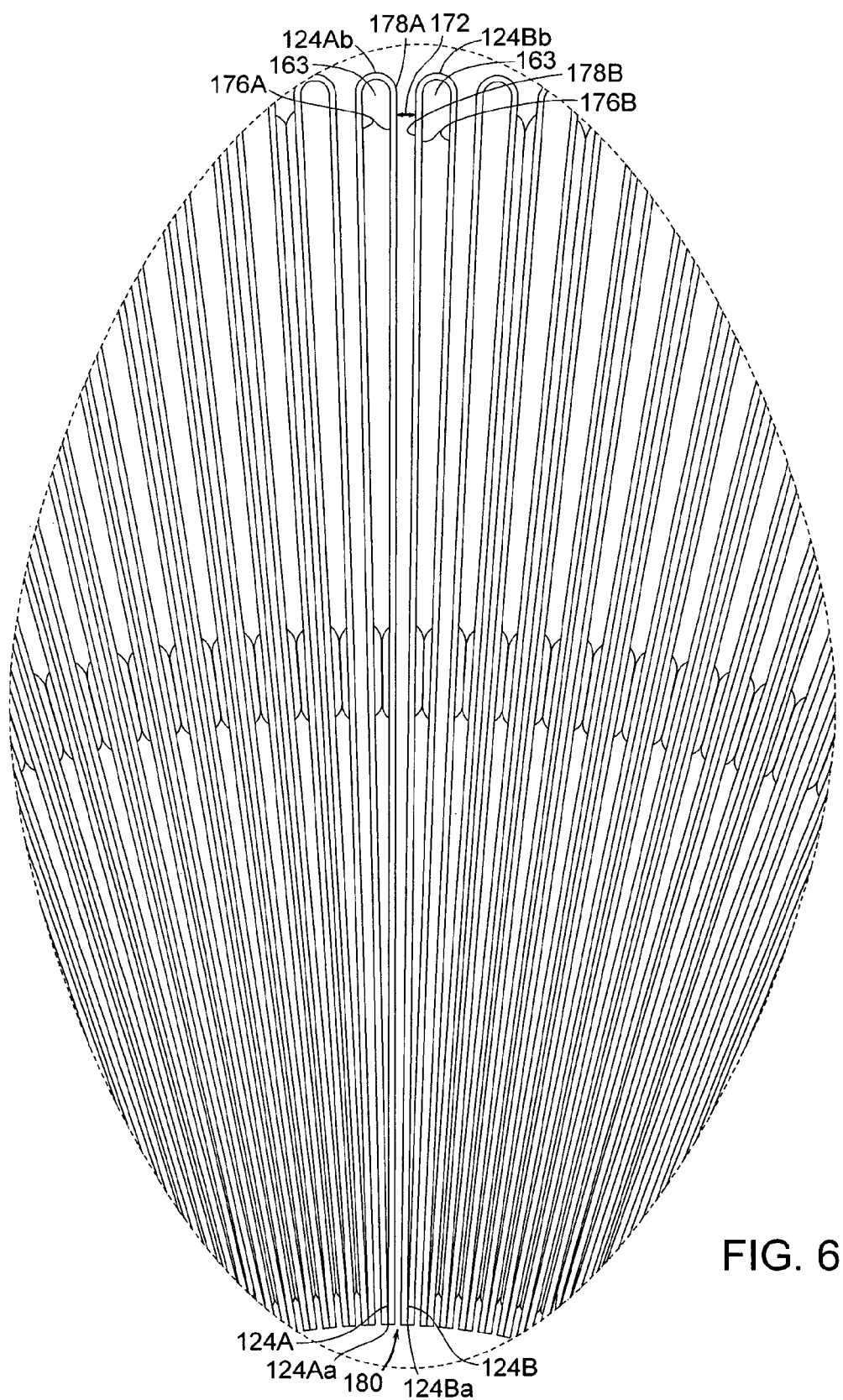
FIG. 6 is a exaggerated partial top view of the distillation system taken at line 6-6 of FIG. 1.

FIG. 6 is a simplified partial top view of the distillation system 10, with parts removed, taken at line 6-6 of FIG. 1A. It shows that blades 124A and 124B include exterior surfaces 178A and 178B and interior surfaces 176A and 176B. Adjacent blades 124A and 124B are separated by a radial passage 172 having an entrance 180 adjacent to their inner radial edges 124Aa. That passage extends between exterior blade surfaces 178A and 178B to the blades' outer radial edges 124Ab and 124Bb.

I believe that it enhances surface wetting for the widths of the entrances 180 to be smaller than the average diameter of the liquid droplets that emanate from the openings 196 in the spray tubes. To that end, it will usually be best if the entrances 180 of the radial passages 172 between most adjacent blades 124A and 124B are less than 1.8 mm (70 mils) wide. Moreover, my preference is that the entrances 180 be between 0.4 mm (15 mils) and 0.8 mm (30 mils) wide.

In the illustrated embodiment, not all of the entrances 180 meet this limitation; some entrances 180 are larger to accommodate the removal tubes 175 and 177. Still, it is best if at least ninety percent of the number of pairs of blades 124 do meet it.

Although FIG. 6 exaggerates the passage widths and those widths' variations, exterior surfaces 178A and 178B of the illustrated embodiment's adjacent blades 124A and 124B actually are generally parallel to each other along the majority of their radial extent. In particular, the illustrated embodiment's radial passage 172 is sized and shaped such that the width of the radial passage 172 between the exterior surfaces 178A and 178B is similar to the size of the entrance 180 throughout most of their radial extents. I believe that this feature contributes to effective surface wetting. I therefore prefer that, for most of their radial extents, the widths of the passages 172 between most pairs of adjacent blades 124 be less than 1.8 mm (70 mils) and, preferably, between 0.4 mm (15 mils) to 0.8 mm (30 mils).

Figure 7:
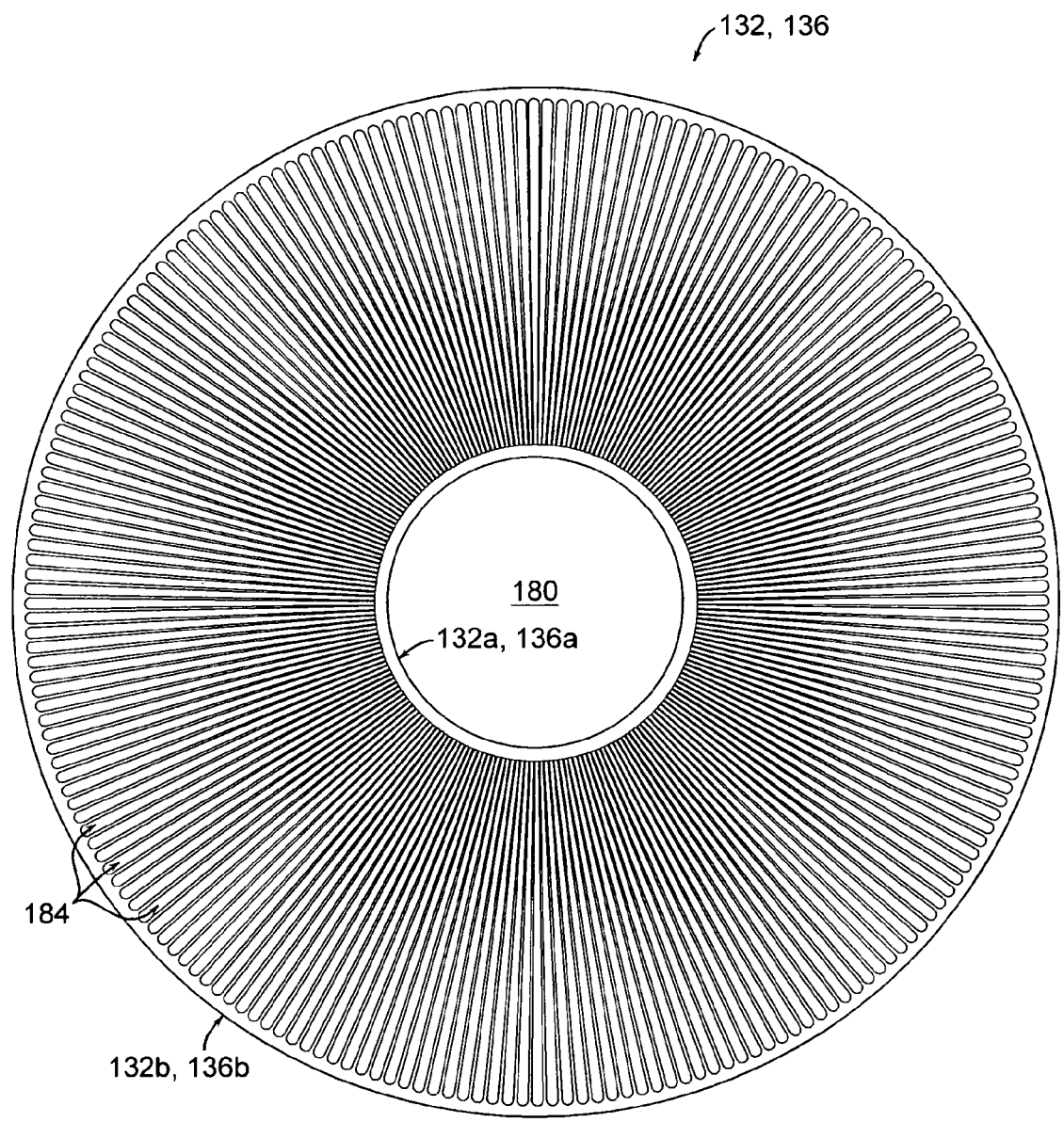
FIG. 7 is a top view of an end plate in the exemplary blade heat exchanger of FIG. 1.

FIG. 7 is a top view of an end plate 132, 136 in the distillation system 100. As shown in FIG. 7, the end plate 132, 136 forms a central aperture 180 and radially-extending slots 184. The slots 184 are sized and shaped so that, when the respective axial ends 124c and 124d of the blades 124 are mounted in the end plates 132 and 136, the slots 184 seal the exterior surfaces 178 of the blades 124 adjacent the axial openings 164c and 164d. As previously described, the shapes of the axial openings 164c and 164d in some embodiments are different from those illustrated, and those embodiments' slots will differ from the illustrated slots.

The end plates 132 and 136, the blades 124, and the side wall 120 collectively define two spaces within the housing 104, which spaces are referred to herein as the composite condensation chamber and the composite evaporation chamber. The interiors 162 of the blades 124 are constituent condensation chambers that cooperate to form the composite condensation chamber. The composite condensation chamber is in fluid communication with compressor 140 through the compressor outlets 148 (FIG. 1B) and the openings 164c in the first axial ends 124c of the blades 124. The composite condensation chamber is also in fluid communication with the distillate-collection receptacle 160 via the openings 164d in the second axial ends 124d of the blades 124. The exterior surfaces 178 of the blades 124 and the inner surface 123 of the shell 100 cooperate to form a composite evaporation chamber that extends from the radially interior portion of the heat exchanger 122 through radial passages 172 between opposite exterior surfaces 178A and 178B of adjacent blades 124A and 124B to the inner surface 123 of the shell 100. The composite evaporation chamber is in fluid communication with the liquid inlet 190 and with the compressor inlets 144. The end plates 132 and 136 cooperate to isolate the composite condensation chamber from the composite evaporation chamber by sealing the exterior surfaces 178 of the blades 124 adjacent the openings 164c and 164d in their axial ends 124c and 124d.

In some embodiments, less than all of the blades 124 may cooperate to define the condensation and evaporation chambers. But at least a majority will in most embodiments.

Some principles of operation of the disclosed blade heat exchangers are now described. Arrows designate fluid-flow paths in FIGS. 1A, 1B, 2A, 2B, and 6. In the following discussion, the interior of each blade 124 is referred to as a constituent condensation chamber 163, and the radial passage 172 between the opposite exterior surfaces 178A and 178B of each pair of adjacent blades 124A and 124B is referred to as a constituent evaporation chamber 172. Each constituent condensation chamber 163 is sealed at its inner and outer radial edges 124a and 124b but open at its first and second axial ends 124c and 124d. In contrast, each constituent evaporation chamber 172 is open at its inner and outer radial edges but sealed at its axial ends by the end plates 132 and 136. In some embodiments, the surfaces of the constituent condensation and evaporation chambers 163 and 172 may be made hydrophobic and hydrophilic, respectively, to facilitate distillation, possibly by applying hydrophobic and hydrophilic coatings.

Although the liquid to be distilled in the following discussion is water, the invention can be used for distilling other liquids, too.

In operation, the rotary-power source 12 that FIG. 1 depicts is coupled through a speed reducer such as a belt and a gear transmission to the shell 100 and thereby rotates it as well as the compressor 140, first and second end plates 132 and 136, heat exchanger 122, and sump 184 about central axis A-A. Liquid from inlet 190 therefore forms a thin liquid film on the evaporation surfaces 178A and 178B. The rotational speed should be such that the radial acceleration at the blades' radially outward edges is between 20 g and 100 g and, preferably, between 30 g and 60 g, where g represents the acceleration due to gravity, i.e., 9.81 m/s$^2$ (32.2 ft/s$^2$).

The compressor 140 draws the resultant vapor from the composite evaporation chamber at a first vapor pressure into the compressor inlet 144 and provides compressed vapor at a second, higher vapor pressure to the composite condensation chamber via the compressor outlets 148.

The liquid to be distilled flows through a liquid feed-line into the sump 184. As the sump 184 rotates, the feed tubes 192 collect a volume of feed water through openings that open in the direction opposite the sump 184's rotation and are disposed close to the shell 100's inner surface 123 to collect rotating water that flows down the inner surface 123 towards the sump 184. The feed tubes 192 conduct the feed water to the stationary axially extending spray tubes 194. The spray tubes 194 project the feed water through the openings 196 in the form of water droplets. These water droplets then impinge upon the entrances 180 to the constituent evaporation chambers.

As will be understood by those of ordinary skill in the art, the rate and the size of the water droplets impinging upon the entrances 180 to the constituent evaporation chambers 172 depend upon the speed of the rotary-power source 12, the sizes of the feed tubes 192 and their openings, the sizes of the spray tubes 194 and their openings 196, the locations of the spray tubes 194 in the interior of the heat exchanger 122, the orientations of the openings 196 with respect to the direction of rotation, and other factors. Generally, the values of one or more of these factors are selected during design (and/or operation) to achieve various effects that facilitate distillation.

For example, in some embodiments that include a motor 12, the speed of the motor 12 and the sizes of the feed and spray tubes 192 and 194 and their respective openings are so selected that the feed water forced from the feed tubes 192 and up the spray tubes 194 leaves the openings 196 in a non-aerosol form.

Alternatively and/or in combination, in some embodiments, the spray tubes 194 and their openings 196 are sized, disposed at locations in the interior of the heat exchanger 122, and oriented at angles with respect to the central axis A-A such that the water droplets that emanate from the openings 196 do so with tangential velocities that are approximately equal to the tangential velocity of the rotating blades 124.

In designing embodiments of the disclosed blade heat exchangers, most persons of ordinary skill in the art will so choose values of one or more of the previously-described factors that the water droplets that emanate from the openings 196 have average diameters that are greater than the sizes of the entrances 180, with the result that those water droplets that emanate from the openings 196 and impinge upon the entrances 180 strike both of the exterior surfaces 178A and 178B of each pair of adjacent blades 124A and 124B. This enhances distillation efficiency. The liquid droplets that emanate from the openings will usually have average diameters of 2.5 mm (100 mils) or less. The entrances 180 should therefore be less than 2.5 mm (100 mils) wide. In fact, it is better for the entrances 180 to be less than 1.8 mm (70 mils) and preferably between 0.4 mm (15 mils) and 0.8 mm (30 mils).

The water droplets that impinge upon the entrances 180 to the constituent evaporation chambers 172 wet the opposite exterior surfaces 178A and 178B of each pair of adjacent blades 124A and 124B. Since the blades 124 are elongated in the radial direction, the water forms relatively consistent films along the radial extents of the exterior surfaces 178A and 178B. This "equal wetting" feature is enhanced in embodiments in which the average diameter of the water droplets is greater than the sizes of the entrances 180, particularly if the tangential velocities of the water droplets as they leave the openings 196 are those of the blades' radially inward edges.

In most embodiments, each of the exterior surfaces 178A, 178B is sized and shaped such that the size of the angle that a tangent to the surface forms with a radius, i.e., with a line segment that extends perpendicular to the axis of rotation, varies by less than 20° over at least 80 percent of the radial extent of the surface. Since the slopes of the exterior surfaces 178A and 178B are therefore relatively uniform, the water droplets tend to "stick" to both surfaces along the majority of their radial extents: they tend not to separate from the surface prematurely and not to pile up.

The centrifugal force caused by the blades' rotation forces the water from the entrances 180 of the constituent evaporation chambers 172 outward along the opposite exterior surfaces 178A and 178B in the form of thin liquid films or sheets. Since the surface area of a radial portion r of an exterior surface centered about a radial extent r is relatively constant as a function of r, the liquid film tends to cover approximately the same amount of surface area as it is forced outwards. So the liquid film tends to have a relatively uniform thickness along a majority of the radial extent of the exterior surface. This enhances evaporation efficiency. In contrast, in a heat exchanger with vertically stacked annular plates, the surface area of a radial portion r of an evaporating surface centered about a radial extent r increases with increasing r. So the liquid film in a stacked-plate heat exchanger tends to cover more surface area as it is forced outward. This results in a decreasing film thickness.

As the water flows along the opposite exterior surfaces 178A and 178B, heat from the constituent condensation chambers causes a portion of the water to evaporate and form water vapor. That portion of the water that is not converted to water vapor is flung from the exterior surfaces 178A and 178B by centrifugal force, strikes the inner surface 123 of the shell 100 of the housing 104, and drops back into the sump 184 for re-circulation through the blade heat exchanger 122. Since the constituent evaporation chambers are sealed at their axial ends by the first and second plates 132 and 136, that portion of the feed water that does not evaporate enters the sump 184, not the distillate-collection receptacle 160.

The operation of the compressor 140 causes the water vapor to be drawn radially inward from the constituent evaporation chambers, through the interior of the heat exchanger 122, and into the compressor inlets 144. The compressor 140 raises the temperature and pressure of the water vapor and provides the resulting compressed vapor (i.e., steam) through the compressor outlets 148 to the composite condensation chamber. The steam enters the constituent condensation chambers 163 through the openings 164c in their first axial ends 124a. Since the constituent evaporation chambers 172 are sealed at their axial ends by the first and second plates 132 and 136, the steam enters only the constituent condensation chambers 163, not the constituent evaporation chambers 172.

As will be understood by those of ordinary skill in the art, the rate of distillation in the disclosed blade heat exchangers depends on the pressure and temperature differences between the composite evaporation and condensation chambers. If the liquid to be distilled is water, a good compromise between size and efficiency results when the compressor 140 is configured to provide a pressure difference between 0.035 kg/square centimeter (0.5 pounds/square inch) and 0.070 kg/square centimeter (1.0 pound/square inch) between adjacent constituent condensation and evaporation chambers 162 and 172 during steady-state operation. Other embodiments may exhibit different pressure differences, though.

Steam condenses along the interior surfaces 176 of the constituent condensation chambers 163 because the water flowing along the opposite exterior surfaces 178A and 178B of the adjacent evaporation chambers 172 is vaporizing at a temperature (e.g., 212 degrees F.) lower than the steam's saturation temperature (e.g., 215 degrees F.). The centrifugal force causes the resulting condensate (i.e., distilled water) to move to the outer radial edges 124b of the constituent condensation chambers 163. The distilled water and the non-condensables pass through the openings 164d in the second axial ends 124d into the distillate-collection receptacle 160.

As more and more steam condenses, the level of distilled water in the distillate-collection pan 160 advances radially inward until it reaches the opening in the distillate-removal tube 175. The distilled water then forms a column in the distillate-removal tube 175 and thereby eventually leaves the system 10. Similarly, non-condensables that collect in the distillate-collection pan 160 are vented from the system 10 through non-condensables-removal tube 177.

Generally, as previously described, many features of the disclosed blade heat exchangers cooperate to facilitate distillation. One embodiment of my design, which uses a blade heat exchanger that includes approximately 225 blades disposed about a central axis A-A, in which each blade 124 includes a radial extent r of approximately 5 cm (2 inches), an opening angle $\theta$ of approximately 1.5 degrees, an axial extent a of approximately 30 cm (12 inches), and entrances 180 between adjacent blades 124A and 124B between approximately 0.4 mm (15 mils) and approximately 0.8 mm (30 mils), can distill water at a rate of at least 55 liters/hour (15 gallons/hour) for motor speeds that produce radial accelerations between 30 g and 60 g at the blades' outer edges.

In summary, my blade heat exchangers provide simple axial flow paths for removal of non-condensables and reduce the risk of cross-contamination between the liquid being distilled and the resulting distillate. As FIGS. 1A, 1B, 2A, and 2B show, the tubes 177 that remove the non-condensables extend upward from the distillate-collection pan 160, inward through a passage in plug 181, down through an axial conduit along the axis A-A to a rotary coupling, and then outward from the system 10. As can be appreciated from the foregoing description, moreover, any defects in the blades will more likely result in harmless leakage of distillate into the incoming liquid than in the less-desirable leakage of the incoming water into the distillate. Specifically, the pressure that prevails in the blades' interiors, which contain the distillate, is higher than at their exteriors, where the undistilled inlet liquid is located, so the pressure difference would tend to cause flow outward through a hole in a blade, not inward. And, although centrifugal force will result in a significant pressure head in the undistilled liquid that collects at the sump sidewall surface 123, that liquid is located outboard of the blades and the distillate-removal tube 175.

Those of ordinary skill in the art will recognize or be able to ascertain many equivalents to the exemplary embodiments described herein by using no more than routine experimentation.

For example, the compressed vapor does not have to flow downward through the blades; it could flow upward. Indeed, the heat exchanger's axis of rotation does not have to be vertical, although it will be in most embodiments.

Also, the disclosed blade heat exchangers can be used in distillation systems whose compressed vapor is not, or at least not solely, the result of evaporation from the heat exchangers' evaporation surfaces. In a manufacturing facility, for example, the facility's dirty water can be supplied to the constituent evaporation chambers, while the some of the steam supplied to the constituent condensation chambers could be the facility's waste steam, possibly mixed with the evaporation chambers' output.

Accordingly, the appended claims are not to be limited to the embodiments described herein.

The invention claimed is:

1. A system for use in distilling a liquid, the system comprising:
    a housing,
    a rotary-power source for supplying rotary power within the housing,
    a liquid inlet for providing the liquid to be distilled to the housing,
    a compressor including a compressor inlet for receiving a vapor at a first vapor pressure and a compressor outlet for emitting the vapor at a second higher vapor pressure,
    a distillate-collection receptacle for collecting distillate in the housing, and
    a heat exchanger disposed within the housing and operatively coupled to the rotary-power source for rotation thereby about an axis, the heat exchanger including axially extending blades that are elongated in the radial direction and arranged about the axis such that:
        the exteriors of the blades and the inner surface of the housing cooperate to form a composite evaporation chamber that is in fluid communication with the liquid inlet for receiving the liquid to be distilled therefrom and with the compressor inlet for providing a vapor at the first vapor pressure thereto,
        the composite evaporation chamber extends from the radially interior portion of the heat exchanger through radial passages between opposite exterior surfaces of adjacent blades to the radial extent of the housing, in which the entrances of the radial passages between the opposite exterior surfaces of a least some of the adjacent blades span a distance that is less than 1.8 mm (70 mils), and
        the interiors of at least some of the blades form respective constituent condensation chambers in such fluid communication with other such constituent condensation chambers as to form a composite condensation chamber that is isolated from the evaporation chamber and that is in fluid communication with the compressor outlet for receiving the vapor at the second vapor pressure therefrom and with the distillate-collection receptacle for providing distillate thereto.

2. The system of claim 1, wherein the distance is between 0.4 mm (15 mils) and 0.8 mm (30 mils).

3. A system for use in distilling a liquid, the system comprising:
    a housing,
    a rotary-power source for supplying rotary power within the housing,
    a liquid inlet for providing the liquid to be distilled to the housing,
    a compressor including a compressor inlet for receiving a vapor at a first vapor pressure and a compressor outlet for emitting the vapor at a second, higher vapor pressure,
    a distillate-collection receptacle for collecting distillate in the housing, and
    a heat exchanger disposed within the housing and operatively coupled to the rotary-power source for rotation thereby about an axis, the heat exchanger including axially extending blades that are elongated in the radial direction and arranged about the axis such that:
        the exteriors of the blades and the inner surface of the housing cooperate to form a composite evaporation chamber that is in fluid communication with the liquid inlet for receiving the liquid to be distilled therefrom and with the compressor inlet for providing a vapor at the first vapor pressure thereto,
        the interiors of at least some of the blades form respective constituent condensation chambers in such fluid communication with other such constituent condensation chambers as to form a composite condensation chamber that is isolated from the evaporation chamber and that is in fluid communication with the compressor outlet for receiving the vapor at the second vapor pressure there from and with the distillate-collection receptacle for providing distillate thereto, and
        for a blade whose interior forms one of the constituent condensation chambers and whose exterior cooperates with the interior surface of the housing to form the composite evaporation chamber, the ratio of the volume of the interior of the blade to the surface area of the exterior of the blade is less than 1.5 mm (60 mils).

4. The system of claim 3, wherein the ratio is between 0.25 mm (10 mils) and 0.5 mm (20 ).

5. The system of claim 3, wherein the distillate-collection receptacle includes a region for collecting distillate and a region for collecting non-condensable, and the system further comprises:

at least one distillate-removing tube extending through the housing and into the distillate-collection receptacle, the at least one distillate-removing tube so positioned in the distillate-collection receptacle as to extend into the region for collecting distillate so as to remove the distillate therefrom.

6. The system of claim 5, wherein each of the at least one distillate-removing tube extends axially between opposite exterior surfaces of a pair of adjacent blades.

7. The system of claim 5, further comprising:
at least one non-condensable-removing tube extending through the housing and into the distillate-collection receptacle, the at least one non-condensable removing tube so positioned in the distillate-collection receptacle as to extend into the region for collecting non-condensables so as to remove the non-condensables therefrom.

8. The system of claim 3, wherein each blade includes an axially-extending fold and a pair of opposing edges joined together in an axially-extending junction radially spaced from the fold.

9. The system of claim 8, wherein the axially-extending fold is disposed at a location radially outward from the axially-extending junction.

10. A system for use in distilling a liquid, the system comprising:
a housing,
a rotary-power source for supplying rotary power within the housing,
a liquid inlet for providing the liquid to be distilled to the housing,
a compressor including a compressor inlet for receiving a vapor at a first vapor pressure and a compressor outlet for emitting the vapor at a second, higher vapor pressure,
a distillate-collection receptacle for collecting distillate in the housing, and
a heat exchanger disposed within the housing and operatively coupled to the rotary-power source for rotation thereby about an axis, the heat exchanger including axially extending blades that are elongated in the radial direction and arranged about the axis such that:
the exteriors of the blades and the inner surface of the housing cooperate to form a composite evaporation chamber that is in fluid communication with the liquid inlet for receiving the liquid to be distilled therefrom and with the compressor inlet for providing a vapor at the first vapor pressure thereto,
the interiors of at least some of the blades form respective constituent condensation chambers in such fluid communication with other such constituent condensation chambers as to form a composite condensation chamber that is isolated from the evaporation chamber and that is in fluid communication with the compressor outlet for receiving the vapor at the second vapor pressure therefrom and with the distillate-collection receptacle for providing distillate thereto, and
for a blade whose interior forms one of the constituent condensation chambers and whose exterior cooperates with the interior surface of the housing to form the composite evaporation chamber, the ratio of the radial extent of the blade to the circumferential extent of the blade is a least 10.

11. The system of claim 10, wherein the ratio is between 20 and 50.

12. The system of claim 10 wherein:
the distillate-collection receptacle includes a region for collecting distillate and a region for collecting non-condensables, and
the system further comprises at least one distillate-removing tube extending through the housing and into the distillate-collection receptacle, the at least one distillate-removing tube so positioned in the distillate-collection receptacle as to extend into the region for collecting distillate so as to remove the distillate therefrom.

13. The system of claim 12 wherein each of the at least one distillate-removing tube extends exially between opposite exterior surfaces of a pair of adjacent blades.

14. The system of claim 12, further comprising at least one non-condensable-removing tube extending through the housing and into the distillate-collection receptacle, the at least one non-condensable removing tube so positioned in the distillate-collection receptacle as to extend into the region for collecting non-condensables so as to remove the non-condensables therefrom.

15. The system of claim 10 wherein each blade includes an axially-extending fold and a pair of opposing edges joined together in an axially-extending junction radially spaced from the fold.

16. A system for use in distilling a liquid, the system comprising:
a housing,
a rotary-power source for supplying rotary power within the housing,
a liquid inlet for providing the liquid to be distilled to the housing,
a compressor including a compressor inlet for receiving a vapor at a first vapor pressure and a compressor outlet for emitting the vapor at a second, higher vapor pressure,
a distillate-collection receptacle for collecting distillate in the housing, and
a heat exchanger disposed within the housing and operatively coupled to the rotary-power source for rotation thereby about an axis, the heat exchanger including axially extending blades that are elongated in the radial direction and arranged about the axis such that;
the exteriors of the blades and the inner surface of the housing cooperate to form a composite evaporation chamber that is in fluid communication with the liquid inlet for receiving the liquid to be distilled therefrom and with the compressor inlet for providing a vapor at the first vapor pressure thereto,
the interiors of a least some of the blades form respective constituent condensation chambers in such fluid communication with other such constituent the evaporation chamber and that is in fluid communication with the compressor outlet for receiving the vapor at the second vapor pressure therefrom and with the distillate-collection receptacle for providing distillate thereto,
the interiors of those blades that form the composite condensation chamber are in fluid communication with the compressor outlet via first openings formed in first axial ends of those blades and with the distillate-collection receptacle via second openings formed in second axial ends of those blades, and
the first openings extend along substantially the entire radial extents of the interiors of those blades, and at least some of the second openings extend along only a portion of the radial extents of the interiors of those blades.

17. A system for use in distilling a liquid, the system comprising:
a housing,
a first end plate disposed within the housing as to be substantially perpendicular to an axis, the first end plate including a central aperture and radially extending slots,
a second end plate so disposed within the housing as to be substantially perpendicular to the axis, the second end plate including a central aperture and radially extending slots,
a rotary-power source for supplying rotary power within the housing,
a liquid inlet for providing the liquid to be distilled to the housing,
a compressor including a compressor inlet for receiving a vapor at a first vapor pressure and a compressor outlet for emitting the vapor at a second, higher vapor pressure,
a distillate-collection receptacle for collecting distillate in the housing, and
a heat exchanger disposed within the housing and operatively coupled to the rotary-power source for rotation thereby about the axis, the heat exchanger including axially extending blades that are elongated in the radial direction and arranged about the axis such that:
the exteriors of the blades and the inner surface of the housing cooperate to form a composite evaporation chamber that is in fluid communication with the liquid inlet for receiving the liquid to be distilled therefrom and with the compressor inlet for providing a vapor at the first vapor pressure thereto,
the interiors of at least some of the blades form respective constituent condensation chambers in such fluid communication with other such constituent condensation chambers as to form a composite condensation chamber that is isolated from the evaporation chamber and that is in fluid communication with the compressor outlet for receiving the vapor at the second vapor pressure therefrom and with the distillate-collection receptacle for providing distillate thereto,
the interiors of those blades that form the composite condensation chamber are fluid communication with the compressor outlet via first openings formed in first axial ends of those blades and with the distillate-collection receptacle via second openings formed in second axial ends of those blades, and
the radially extending slots in the first end plate seal the exteriors of those blades adjacent the first openings formed in the axial ends of at least some of those blades, and
the radially extending slots in the second end plate seal the exteriors of those blades adjacent the second openings formed in the second axial ends of at least some of those blades, such that the first and second end plates cooperate to isolate the composite evaporation chamber from the composite condensation chamber.

18. The system of claim 17, wherein the distillate-collection receptacle is mounted to the inner and outer diameter edges of the second end plate so as to collect distillate formed in the composite condensation chamber and flowing through the second openings in the second axial ends of those blades.

19. The system of claim 18, wherein the distillate-collection receptacle is substantially toroidal.

20. The system of claim 17, further comprising:
first and second frame elements disposed within the housing substantially perpendicular to the axis, each frame element including an inner ring and an outer ring concentric with the inner ring and connected to the inner ring via radially-extending support members disposed at substantially equal angular intervals,
wherein the heat exchanger is mounted between the first frame element and the second frame element, such that the first and second end plates are disposed between the inner and outer rings of the respective first and second frame elements.

21. A system for use in distilling a liquid, the system comprising:
a housing,
a rotary-power source for supplying rotary power within the housing,
a liquid inlet for providing the liquid to be distilled to the housing, the liquid inlet including at least one spray tube extending generally in the same direction as an axis of the system, p1 a compressor including a compressor inlet for receiving a vapor at a first vapor pressure and a compressor outlet for emitting the vapor at a second, higher vapor pressure,
a distillate-collection receptacle for collecting distillate in the housing, and
a heat exchanger disposed within the housing and operatively coupled to the rotary-power source for rotation thereby about the axis, the heat exchanger including axially extending blades that are elongated in the radial direction and arranged about the axis such that;
the exteriors of the blades and the inner surface of the housing cooperate to form a composite evaporation chamber that is in fluid communication with the liquid inlet for receiving the liquid to be distilled therefrom and with the compressor inlet for providing a vapor at the first vapor pressure thereto,
the interiors of at least some of the blades form respective constituent condensation chambers in such fluid communication with other such constituent condensation chambers as to form a composite condensation chamber that is isolated from the evaporation chamber and that is in fluid communication with the compressor outlet for receiving the vapor at the second vapor pressure therefrom and with the distillate-collection receptacle for providing distillate thereto,
the at least one spray tube is disposed in the radially interior portion of the heat exchanger at a location radially inward from the blades and includes openings facing in a radially outward direction from the axis, such that a liquid-flow path exists for the liquid to be distilled to flow to the composite evaporation chamber via the at least one spray tube, and
the composite evaporation chamber extends through radial passages between opposite exterior surfaces of adjacent blades to the radial extent of the housing, in which the openings of the at least one spray tube and the entrances of the radial passages are sized and shaped such that, for at least one liquid flow rate in the at least one spray tube, the entrances span a distance that is less than the average diameter of liquid droplets emanating from the openings.

22. A system for use in distilling a liquid, the system comprising:
a housing,
a rotary-power source for supplying rotary power within the housing,
a liquid inlet for providing the liquid to be distilled to the housing, the liquid inlet including at least one spray tube extending generally in the same direction as an axis of the system, a compressor including a compressor inlet for receiving a vapor at a first vapor pressure and a compressor outlet for emitting the vapor at a second, higher vapor pressure, a distillate-collection receptacle for collecting distillate in the housing, and a heat exchanger disposed within the housing and operatively coupled to the rotary-power source for rotation thereby about the axis, the heat exchanger including axially extending blades that are elongated in the radial direction and arranged about the axis such that;

the exteriors of the blades and the inner surface of the housing cooperate to form a composite evaporation chamber that is in fluid communication with the liquid inlet for receiving the liquid to be distilled therefrom and with the compressor inlet for providing a vapor at the first vapor pressure thereto, the interior of at least some of the blades form respective constituent condensation chambers in such fluid communication with other such constituent condensation chambers as to form a composite condensation chamber that is isolated from the evaporation chamber and that is in fluid communication with the compressor outlet for receiving the vapor at the second vapor pressure therefrom and with the distillate-collection receptacle for providing distillate thereto, the at least one spray tube is disposed in the radially interior portion of the heat exchanger at a location radially inward from the blades and includes openings facing in a radially outward direction from the axis, such that a liquid flow-path exists for the liquid to be distilled to flow to the composite evaporation chamber via the at least one spray tube, and the liquid inlet includes at least one liquid-supplying feed tube in fluid communication with the at least one spray tube and extending into a sump defining the liquid to be distilled, such that the at least one liquid-supplying feed tube and the at least one spray tube cooperate to provide a liquid flow-path between the sump and the composite evaporation chamber.

23. A system for use in distilling a liquid, the system comprising:

a housing, a rotary-power source for supplying rotary power within the housing, a liquid inlet for providing the liquid to be distilled to the housing, a compressor including a compressor inlet for receiving a vapor at a first vapor pressure and a compressor outlet for emitting the vapor at a second, higher vapor pressure, a distillate-collection receptacle for collecting distillate in the housing, the distillate-collection receptacle including a region for collecting distillate and a region for collecting non-condensables, at least one distillate-removing tube extending through the housing and into the distillate-collection receptacle, the at least one distillate-removing tube so positioned in the distillate-collection receptacle so as to extend into the region for collecting distillate so as to remove the distillate therefrom, at least one non-condensable-removing tube extending through the housing, axially between opposite exterior surfaces of a pair of adjacent blades, and into the distillate-collection receptacle, the at least one non-condensable removing tube so positioned in the distillate-collection receptacle so as to extend into the region for collecting non-condensables so as to remove the non-condensables therefrom a heat exchanger disposed within the housing and operatively coupled to the rotary-power source for rotation thereby about an axis, the heat exchanger including axially that;

the exteriors of the blades and the inner surface of the housing cooperate to form a composite evaporation chamber that is in fluid communication with the liquid inlet for receiving the liquid to be distilled therefrom and with the compressor inlet for providing a vapor at the first vapor pressure thereto, and the interiors of a least some of the blades form respective constituent condensation chambers in such fluid communication with other such constituent condensation chambers so as to form a composite condensation chamber that is isolated from the evaporation chamber and that is in fluid communication with the compressor outlet for receiving the vapor at the second vapor pressure therefrom and with the distillate-collection receptacle for providing distillate thereto.

24. A system for use in distilling a liquid, the system comprising:

a housing, a rotary-power source for supplying rotary power within the housing, a liquid inlet for providing the liquid to be distilled to the housing, a compressor including a compressor inlet for receiving a vapor at a first vapor pressure and a compressor outlet for emitting the vapor at a second, higher vapor pressure, a distillate-collection receptacle for collecting distillate in the housing, and a heat exchanger disposed within the housing and operatively coupled to the rotary-power source for rotation thereby about an axis, the heat exchanger including axially extending blades that are elongated in the radial direction, have an axial elongation ratio that is greater than 1 and a radial elongation ration that is greater than 10, and are arranged about the axis such that;

the exteriors of the blades and the inner surface of the housing cooperate to form a composite evaporation chamber that is in fluid communication with the liquid inlet for receiving the liquid to be distilled therefrom and with the compressor inlet for providing a vapor at the first vapor pressure thereto, and the interiors of at least some of the blades form respective constituent condensation chambers in such fluid communication with other such constituent condensation chambers as to form a composite condensation chamber that is isolated from the evaporation chamber and that is in fluid communication with the compressor outlet for receiving the vapor at the second vapor pressure therefrom and with the distillate-collection receptacle for providing distillate thereto.

* * * * *